United States Patent [19]

Zuccato

[11] Patent Number: 5,027,496

[45] Date of Patent: Jul. 2, 1991

[54] METHOD OF PROGRESSIVELY MAKING A MODEL OF MULTIPLE ASSEMBLIES

[76] Inventor: Giuliano Zuccato, 38571 Northfarm Dr., Northville, Mich. 48167

[21] Appl. No.: 493,723

[22] Filed: Mar. 15, 1990

[51] Int. Cl.$^5$ .............................................. B23P 19/04
[52] U.S. Cl. ...................................... 29/460; 29/424; 29/527.2; 264/220
[58] Field of Search .............. 29/423, 424, 460, 527.1, 29/527.2, 527.3; 264/40.1, 45.1, 219, 220, 221, 257, 313; 427/133; 156/242, 256; 164/34, 35

[56] References Cited

U.S. PATENT DOCUMENTS

| | | | |
|---|---|---|---|
| 4,474,722 | 10/1984 | Martin | 264/219 |
| 4,538,787 | 9/1985 | Fox et al. | 264/219 X |
| 4,811,778 | 3/1989 | Allen et al. | 164/35 X |
| 4,867,922 | 9/1989 | Zuccato | 264/40.1 |

*Primary Examiner*—Joseph M. Gorski
*Assistant Examiner*—S. Thomas Hughes

*Attorney, Agent, or Firm*—Charles W. Chandler

[57] ABSTRACT

A method for progressively making a model of a sheet metal assembly composed of several connected sheet metal panels, or a model of several interfitting sheet metal assemblies. Each sheet metal panel is represented by a carbon fiber sheet formed between a pair of blocks machined to form a cavity corresponding to the thickness of the sheet metal. The thickness is initially represented by a wax layer corresponding to the thickness of the sheet metal. The wax layer is removed and replaced by a carbon fiber epoxy-based material. One of the blocks is then used to form the replica of a second panel of the sheet metal, adjacent the first panel. The process is repeated until replicas of all panels have been made. The carbon fiber replicas are attached to one another to form the completed model of the sheet metal assembly or a model of several interfitting sheet metal assemblies. The machined foam blocks may be used as tooling aids for forming dies for stamping the sheet metal components.

12 Claims, 3 Drawing Sheets

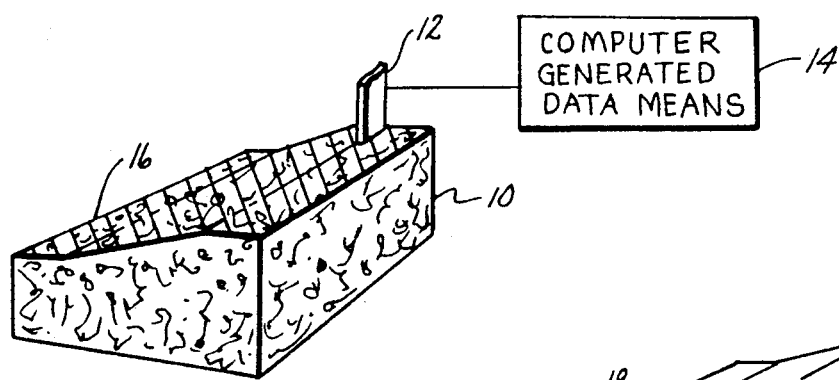
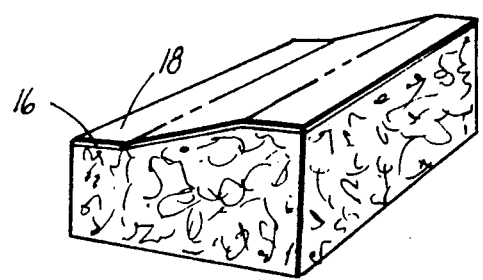
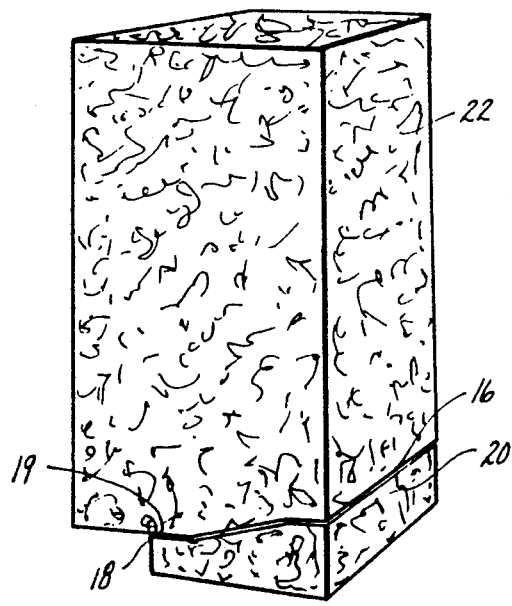
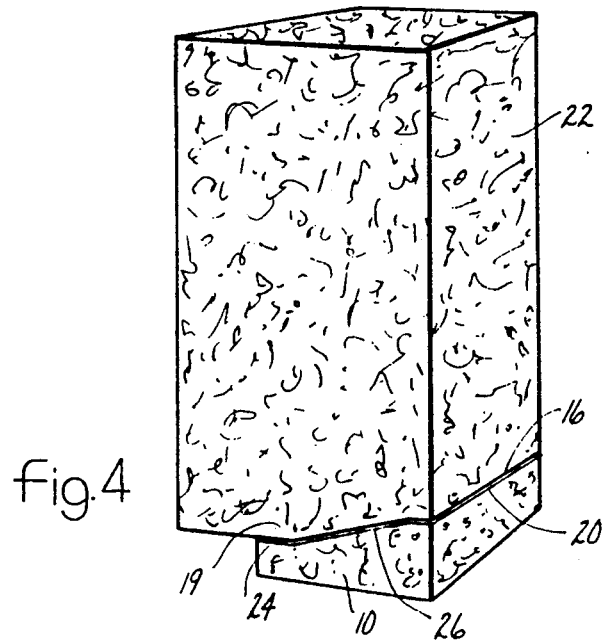
fig. 1
fig. 2
fig. 3
fig. 4

METHOD OF PROGRESSIVELY MAKING A MODEL OF MULTIPLE ASSEMBLIES

BACKGROUND OF THE INVENTION

This invention is related to a process for progressively forming a model of either a single multiple-panel sheet metal assembly or several assemblies having interfitting panels. A replica of each panel is formed in a cavity between a pair of machineable foam blocks. At least one of the foam blocks is then used to form the replica of an adjacent panel of either the same assembly or a close fitting panel of another assembly. The remaining panels are progressively formed and then attached together to form a carbon fiber model of the sheet metal assembly which may, for example, be a part of an automobile sheet metal assembly. The machined foam blocks can be used as tooling aids for making the dies for stamping the sheet metal panels.

DESCRIPTION OF THE PRIOR ART

Models are made in the automotive and other industries for evaluating the appearance of sheet metal vehicle components. A motor vehicle may begin with the construction of a manually-fabricated, reduced-scale clay model. The surface coordinates of the clay model are then stored in a computer. The computer data is used for fabricating a full size clay model.

Some methods have been developed for eliminating full size clay models. Such a method is described in my U.S. Pat. No. 4,867,922 which issued Sept. 19, 1989.

A similar process is sometimes employed to make replicas of individual sheet metal panels, sometimes by different vendors. The panels are ultimately joined together to form an assembly. When individual panels are made from different sources, the dimensional tolerances are such that the panels do not always fit together into a satisfactory assembly.

SUMMARY OF THE INVENTION

The broad purpose of the present invention is to provide a process for making a model of an individual multiple-component assembly or a model of a multiple assembly unit by forming a carbon fiber replica of a panel and then sequentially forming replicas of adjacent interfitting panels. The first panel, which may be the splash panel of an automobile, is formed in a cavity between a pair of machineable foam blocks. The first block is machined from computer generated data to form a surface corresponding to one side of the splash panel. A wax layer is then laid on the first block. The wax layer has a thickness corresponding to the thickness of the splash panel.

An impression is made of the outside surface of the wax layer on a second foam block. The surfaces of the two foam blocks conforming to opposite sides of the wax layer form a cavity. The cavity corresponds to the shape and thickness of the splash panel. An epoxy-based carbon fiber material is then inserted in the cavity and squeezed between the two blocks to form an epoxy-based replica of the splash panel.

The second block is then machined from the computer generated data of the clay model to form one surface of an outer fender. A wax layer is laid on the machined impression of the outer fender. The impression of the outer surface of the wax layer is transferred to a third foam block. The wax layer is removed to form a cavity and an epoxy-based carbon fiber material squeezed in the cavity, between the second and third blocks. The carbon-fiber material hardens to form a replica of the outer fender.

This process is repeated by using additional foam blocks to form the inner fender, the inner hood panel, the outer hood panel and so forth. When the process is completed, the foam blocks are then separated from the carbon fiber panels, and are useful as tooling aids for forming dies for the sheet metal panels. The carbon fiber panels are then joined together by an adhesive to form a multi-component model.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to the like parts throughout the several views, and in which:

FIG. 1 illustrates the first foam block being machined from computer-generated data to form a surface corresponding to the outer surface of a splash panel;

FIG. 2 illustrates a wax layer being mounted on the machined surface of the first foam block;

FIG. 3 is a view illustrating the second foam block having a surface with the impression of the outer surface of the wax layer mounted on the first block;

FIG. 4 represents the wax layer replaced by a carbon-fiber epoxy-based material;

DESCRIPTION OF THE PREFERRED EMBODIMENT

Figure 5:
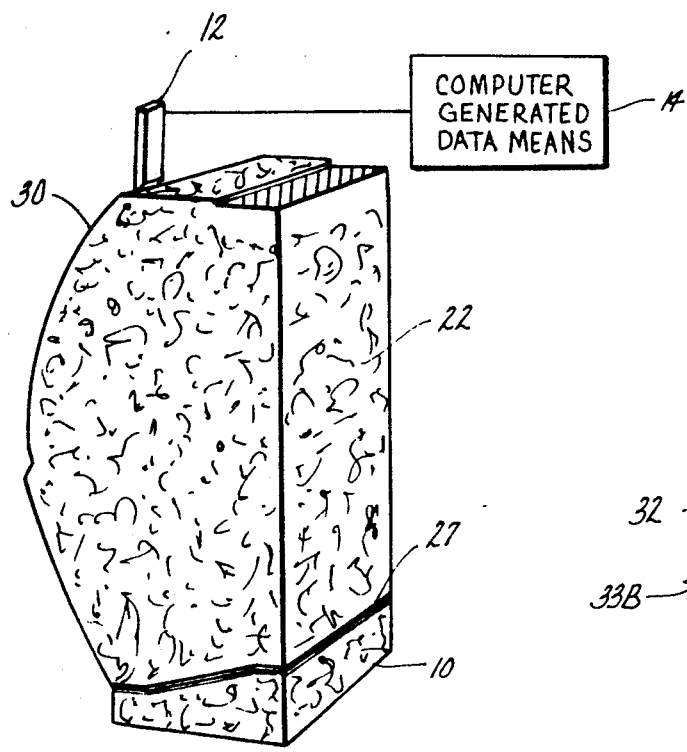
FIG. 5 illustrates the second foam block being milled with a surface corresponding to the outer fender.

Referring to the drawings, the preferred process for making a full scale model of a multi-component assembly is illustrated for making a fender assembly of an automobile. The various panels are formed and then attached together to form the assembly.

The basic process employs a foam block 10 which may be of a styrofoam material. A milling tool means 12 is operatively connected to computer-generated data means 14 having a memory with the entire surface coordinates of a scale clay model of the sheet metal assemblies of an entire vehicle. Milling tool means 12 is used for machining a surface 16 which corresponds to the outer surface of a splash panel of the fender assembly.

Referring to FIG. 2, a filler material of a wax layer 18 is then laid over the entire machined surface 16. Wax layer 18 has a thickness corresponding to that of the sheet metal splash panel. Other filler materials such as a clay can be used instead of the wax.

Referring to FIG. 3, an epoxy layer 19, about 2 mils thick is laid over the outer surface of the wax layer. When epoxy layer 19 hardens, it has the impression of the outer surface of the wax layer. A soft tooling foam is then laid on the epoxy layer. The tooling foam hardens to form block 22 which is attached to the epoxy layer with the impression of the outer surface 20 of the splash panel.

Referring to FIG. 4, wax layer 18 is then removed from between the confronting surfaces 16 and 20 of foam blocks 10 and 22 to form a cavity 24 having the depth and surface configuration of the full-size splash panel. The cavity is then filled with semi-liquid, epoxy-based carbon fiber material 26. Carbon fiber material 26 is squeezed between the two blocks to completely fill cavity 24. The epoxy-based carbon fiber material is representative of many materials that can be either laid, poured or otherwise placed in the cavity, and which hardens, such as by use of a catalyst. For example, a pourable urethan material which hardens with the use of a catalyst could be used.

Referring to FIG. 5, when epoxy-based material 26 has hardened in the customary manner, it then forms a full size replica 27 of the sheet metal splash panel.

Foam block 10 customarily remains in position, supporting splash panel replica 27.

Milling tool 12 is then employed for milling a surface 30 on block 22 with the inner surface configuration of the outer fender panel of the fender assembly. The data is derived from computer generated data means 14 of the clay model or computer aided design.

Figure 6:
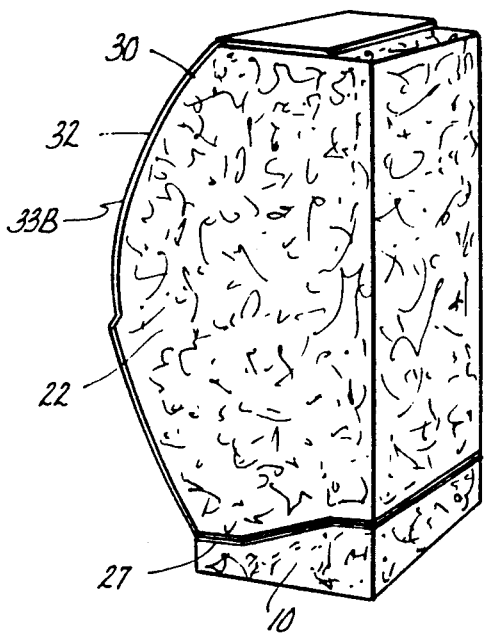
FIG. 6 shows a second wax layer being mounted on the milled surface of the second foam block.

The process is repeated for forming a replica of the outer fender panel. Referring to FIG. 6, a wax layer 32 is laid over machined surface 30. Wax layer 32 has a thickness corresponding to the thickness of the outer fender panel.

Figure 7:
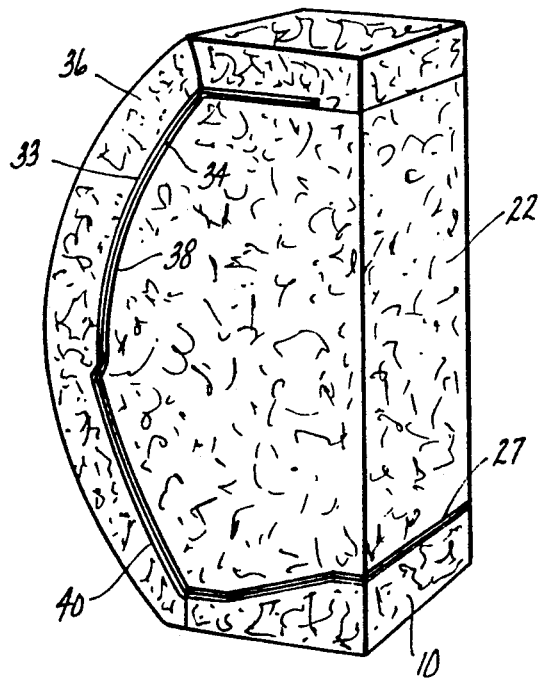
FIG. 7 illustrates a third foam block having a surface with an impression of the outer surface of the second wax layer.
Figure 8:
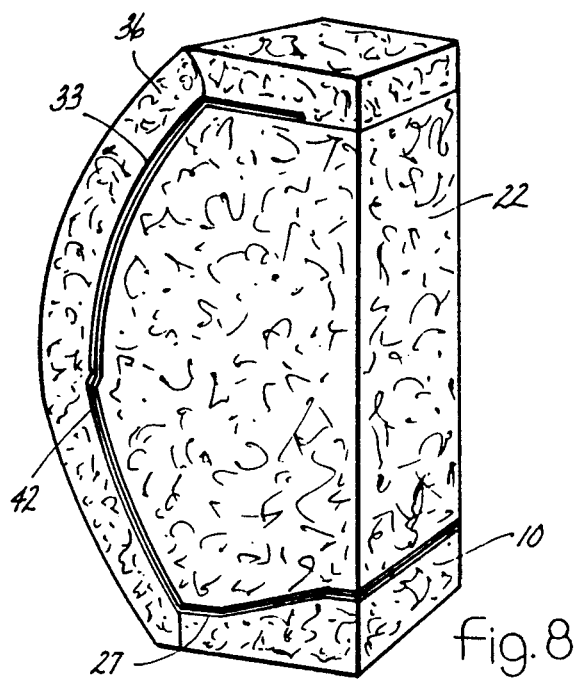
FIG. 8 illustrates the second wax layer replaced by a carbon-fiber epoxy based material to form a replica of the outer fender.

Referring to FIG. 7, an epoxy layer 33 about 2 mils thick, is laid over the outer surface of wax layer 32. When hardened, layer 33 has the impression of the outer surface of the wax layer. A soft tooling foam is then attached to layer 33, and hardens to form block 36. Block 36 has the surface impression of the outer surface of the outer fender.

Carbon fiber, epoxy-based material 40 is then squeezed between foam blocks 22 and 36 to form a carbon fiber panel 42 which, when hardened, forms a full size replica of the sheet metal outer fender panel. Panel 42 is formed adjacent splash panel replica 27.

Figure 9:
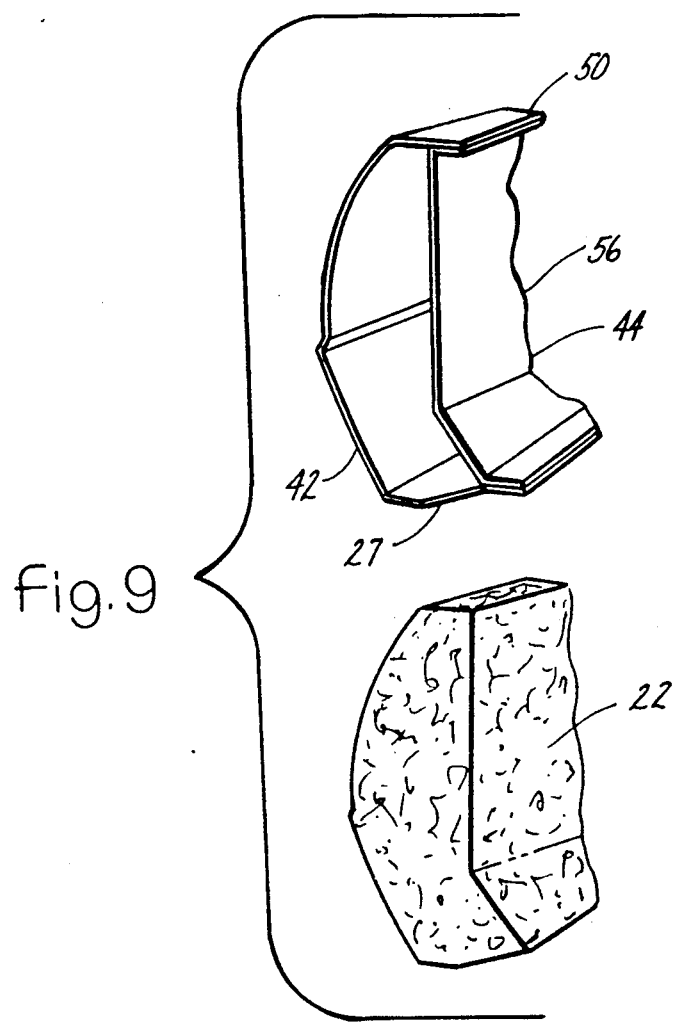
FIG. 9 illustrates several epoxy-based panels joined together to form a multi-component model after the foam blocks have been removed.
Figure 10:
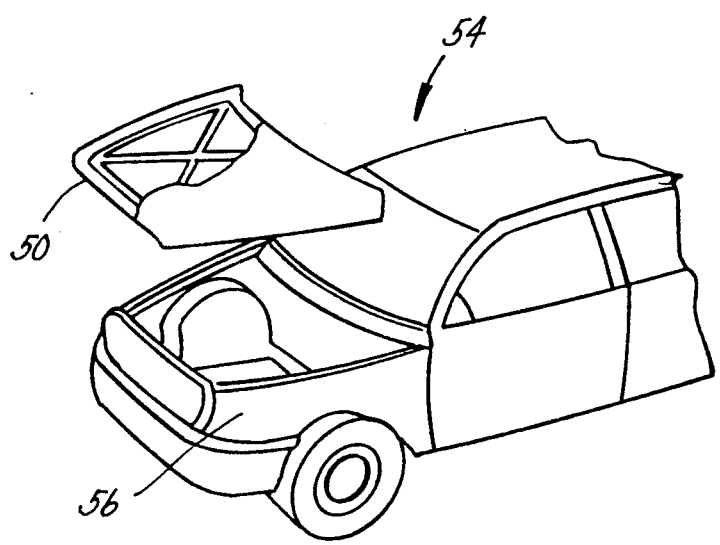
FIG. 10 illustrates replicas of several assemblies of an automotive unit formed by the inventive process.

Referring to FIG. 9, a similar process is then carried out to form a third carbon fiber, epoxy-based replica 44 of the inner fender panel adjacent the replicas of the outer fender panel and the splash panel. When carbon fiber panel 44 is hardened, the process may be continued to form a model of the hood assembly 50 and other sheet metal assemblies of the entire vehicle 52 (see FIG. 10.)

When the process has been completed, the blocks are disassembled and may be used as tooling aids for forming the dies for stamping the sheet metal panels because they have the full size surface configuration of the sheet metal panels. The carbon fiber replicas of the sheet metal panels are then attached together along their mating edges by a suitable adhesive to form a full size carbon fiber model. A model 54 of the entire vehicle is formed by making models of several interfitting sheet metal assemblies, in which at least one foam block is used for forming replica panels of two adjacent assemblies of the unit.

The process may employ other forms. For example, the blocks forming the three panels may be machined to form their respective cavities, and then the epoxy-based material squeezed in their respective cavities as the final step in forming the hardened replica panels.

The process may be employed for an assembly having several sheet metal components. One of the advantages of the process is that it insures that each of the replica panels will fit with its neighboring panels when assembled into a final model. Another advantage is that the foam blocks provide tooling aids for developing the sheet metal stamping dies.

FIG. 9 illustrates the completed carbon fiber fender 56, and foam block 22 having the surface configurations of the splash panel, the outer fender panel and the inner fender panel.

Having described my invention, I claim:

1. A method for progressively making a model of a multiple panel sheet metal assembly having close fitting component panels, comprising the steps of:

providing a first block of machineable material;

machining a first surface on the first block corresponding to a surface of a first side of a first panel of the sheet metal assembly;

laying a layer of a filler material on the first machined surface in a thickness corresponding to the first panel such that a first side of the layer of filler material conforms with the first machined surface of the first block;

providing a second block of a machineable material having a surface conforming to the side of the layer of filler material opposite said first side;

removing the filler material from the machined surface of the first block, thereby forming a first cavity between the first and second blocks of machineable material corresponding to a thickness of the first panel of the sheet metal assembly;

filling the first cavity with a material which hardens to a thickness and with a surface configuration corresponding to the first layer of filler material, thereby providing a replica of said first panel;

machining a second surface of the second block to correspond to a surface of a first side of a second panel of the sheet metal assembly;

laying a second layer of a filler material on the second machined surface of the second block in a thickness corresponding to the second panel of the sheet metal assembly such that a first side of the second layer of filler material conforms with the second machined surface of the second block;

providing a third block of machineable material having a surface conforming to a side of the second layer of filler material opposite a side laid on the second machined surface of the second block;

removing the second layer of filler material from the second machined surface of the second block thereby forming a second cavity between the second and third blocks corresponding to the thickness of the second panel of the sheet metal assembly;

filling the second cavity with a material which hardens to a thickness and surface corresponding to the second layer of filler material, thereby providing a replica of the second panel; and removing the first, second and third blocks from the replicas of the first and second panels, and then attaching the replica of the first panel to the replica of the second panel thereby forming a multi-component model of the sheet metal assembly.

2. A method as defined in claim 1, in which at least one of said blocks is useful as a tooling aid for making a die for stamping a sheet metal part corresponding to at least one of said replicas.

3. A method as defined in claim 1, wherein each filling step comprises filling the respective cavity with a carbon fiber epoxy-based material.

4. A method as defined in claim 1, wherein each filling step comprises filling the respective cavity with a fiberglass epoxy-based material.

5. A method as defined in claim 1, including the step of making an impression of the surface of the first mentioned filler layer by laying an epoxy layer of material over the first mentioned filler layer.

6. A method as defined in claim 1, in which the machineable material is a foam material.

7. A method as defined in claim 1, comprising forming the replica panels after all the cavities of the assembly have been formed.

8. A method as defined in claim 1, in which the filler material is a wax material.

9. A method of defined in claim 1, wherein each filling step comprises pouring a material that hardens into each cavity.

10. A method as defined in claim 1, including the step of filling each cavity with an epoxy-based material which hardens thereby providing a replica panel.

11. A method for making a model of a unit of several interfitting panels of a sheet metal assembly, comprising the steps of:

(a) providing a first block of machineable material;
(b) machining a first surface on the first block corresponding to a surface of a first side of a first panel of the sheet metal assembly;
(c) laying a first layer of a filler material on the first machined surface in a thickness corresponding to the first panel such that a first side of the layer of filler material conforms with the first machined surface of the first block;
(d) providing a second block of a machineable material having a surface conforming to the side of the layer of filler material opposite said first side.
(e) removing the filler material from the machined surface of the first block thereby forming a first cavity between the first and second blocks of machineable material corresponding to a thickness of the first panel of the sheet metal assembly;
(f) filling the first cavity with a material which hardens to a thickness and with a surface configuration corresponding to the first layer of filler material, thereby providing a replica of said first panel;
(g) machining a second surface of the second block to correspond to a surface of a first side of a second panel of the sheet metal assembly;
(h) laying a second layer of a filler material on the second machined surface of the second block in a thickness corresponding to the second panel of the sheet metal assembly such that a first side of the second layer of filler material conforms with the second machined surface of the second block;
(i) providing a third block of machineable material having a surface conforming to a side of the second layer of filler material opposite a side laid on the second machined surface of the second block;
(j) removing the second layer of filler material from the second machined surface of the second block thereby forming a second cavity between the second and third blocks correspondingly to a thickness of the second panel of the sheet metal assembly;
(k) filling the second cavity with a material which hardens to a thickness and surface corresponding to the second layer of filler material thereby providing a replica of the second panel;
(l) repeating steps a–k until a sufficient number of replica panels have been formed;
(m) attaching the replica panels together thereby forming a first model assembly;
(n) repeating steps a–m thereby forming a second model assembly which interfits with the first model assembly by using at least one of the blocks used for a replica panel of the first model assembly.

12. A method for progressively making a model of a multiple panel sheet metal assembly having close fitting component panels, comprising the steps of:

providing a first block of machineable material;
machining a first surface on the first block corresponding to a surface of a first side of a first panel of the sheet metal assembly;
laying a first layer of a filler material on the first machined surface in a thickness corresponding to the first panel such that a first side of the layer of filler material conforms with the first machined surface of the first block;
providing a second block of a machineable material having a surface conforming to a side of the layer of filler material opposite said first side;
machining a second surface of the second block to correspond to a surface of a first side of a second panel of the sheet metal assembly;
laying a second layer of a filler material on the second machined surface of the second block in a thickness corresponding to the second panel of the sheet metal assembly such that a first side of the second layer of filler material conforms with the second machined surface of the second block;
providing a third block of machineable material having a surface conforming to a side of the second layer of filler material opposite the side laid on the second machined surface of the second block;
removing the first and second layers of filler material from their respective machined surfaces thereby forming a first cavity between the first and second blocks corresponding to the first panel of the sheet metal assembly, and a second cavity between the second and third blocks corresponding to the second panel of the sheet metal assembly;
filling the first cavity and the second cavity with a material which hardens to a thickness and surface corresponding to the first layer of filler material and the second layer of filler material thereby forming a replica of the first and second panels; and
removing the first, second and third blocks from the replicas of the first and second panels, and then attaching the replica of the first panel to the replica of the second panel thereby forming a multi-component model of the sheet metal assembly.

* * * * *